(No Model.)
W. H. MILLER.
ARTIFICIAL DENTURE.
No. 391,062. Patented Oct. 16, 1888.
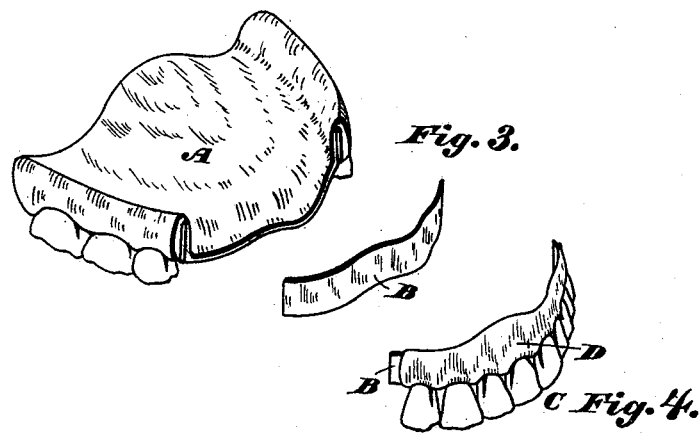
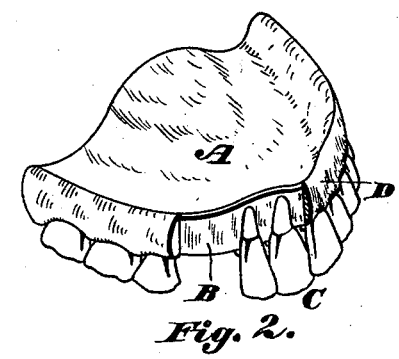
WITNESSES:
Harry Frease.
Chas. F. Miller.
William H. Miller. INVENTOR,
BY
W. H. Miller.
ATTORNEY.

UNITED STATES PATENT OFFICE.

WILLIAM H. MILLER, OF CANTON, OHIO.

ARTIFICIAL DENTURE.

SPECIFICATION forming part of Letters Patent No. 391,062, dated October 16, 1888.

Application filed February 8, 1888. Serial No. 263,377. (No model.)

*To all whom it may concern:*

Be it known that I, WILLIAM H. MILLER, a citizen of the United States, and a resident of Canton, county of Stark, State of Ohio, have invented a new and useful Improvement in Artificial Dentures, of which the following is a full, clear, and exact description, reference being had to the accompanying drawings, making part of this specification.

My invention relates to improvements in artificial dentures.

Hitherto in order to preserve natural facial features plain teeth have been set one at a time to a platina dental plate, and when in position artificial gum has been built around them and fused or baked to the plate. The objections have been to the weight of the plate, and that it required the highest degree of skill to make a perfect success, and the cost so great as to place the completed denture outside of the possession of the masses.

The object of my present invention is to secure all the advantages of the more expensive denture in a manner which will enable it to be successfully manufactured by those of ordinary skill and to greatly reduce the initial cost.

Figure 1 represents the completed denture. Fig. 2 represents the denture as it appears during the process of locating the teeth and applying the gum. Fig. 3 represents the dental plate and the gum-plate. Fig. 4 represents a gum-plate and gum detached.

To secure an artistic adaptation of artificial teeth, it is desirable that the arrangement of the teeth be made to suit the case in hand both as to usefulness and naturalness. This can best be accomplished in entire dentures. My method of producing the desirable result is to form a gum-base of platina or other suitable material, as B, on which to build the teeth and gum, as shown in Fig. 2, and to fuse the gum. The teeth C being selected with reference to the case and so placed on the base, a porcelain paste to form a continuous gum, as D, around the arch of the mouth in whole or in part is applied to the teeth and fused. The next step is to prepare the mold as for a rubber denture, placing the teeth, continuous gum, and the dental rubber to form the denture-plate A on the mold, after which the case is placed in the vulcanizer and the dental rubber vulcanized about the fastenings of the teeth, thus securing a rubber denture plate and teeth having a continuous porcelain gum, after which the denture is finished in the usual way.

Having thus fully described my invention, what I claim, and desire to secure by Letters Patent, is—

The herein-described artificial denture, consisting, essentially, of the non-metallic denture-plate having side gums and teeth attached thereto, a metallic strip having teeth attached thereto, and a porcelain gum fused thereon forming the front of the denture, the metallic plate or gum being secured to the non-metallic denture-plate and the latter vulcanized, forming a denture having a continuous gum, substantially as set forth.

In testimony whereof I have hereunto set my hand this 6th day of February, A. D. 1888.

WILLIAM H. MILLER.

Witnesses:
W. K. MILLER,
CHAS. N. MILLER.